Inventor 3,105,394
DIFFERENTIAL GEAR WITH LOCKING MEANS
Willi Ernst Salzmann, 111 Bielstrasse,
Solothurn, Switzerland
Filed Dec. 27, 1960, Ser. No. 78,784
11 Claims. (Cl. 74—710.5)

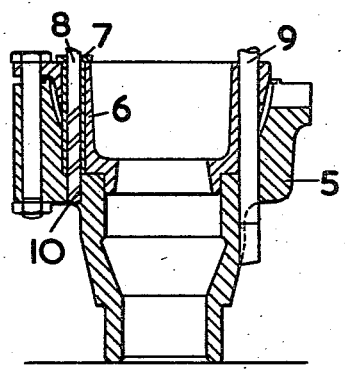
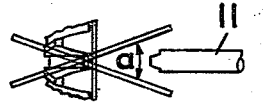
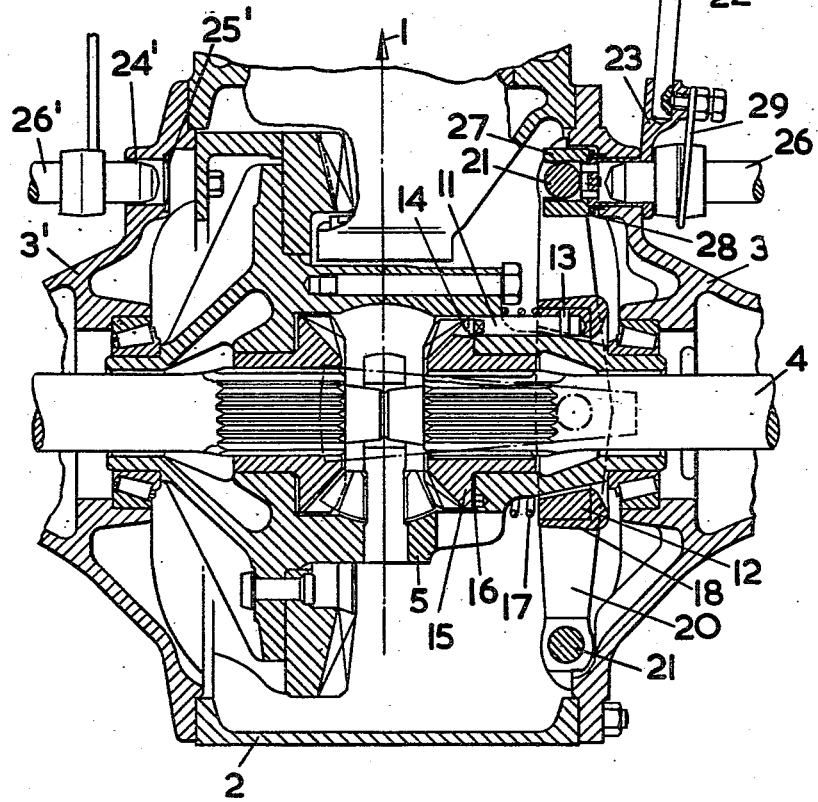
FIG. 4.
FIG. 3.
FIG. 1.

This invention relates to a differential gear with locking means suitable for many kinds of motor vehicles, in particular for tractors. The installation of the locking means may be effected directly by the vehicle manufacturer, or it may be effected after manufacture by relatively simple operations.

According to the invention there is provided a differential gear with locking means, for example for a tractor, comprising substantially conventional differential bevel gear wheels in a substantially conventional differential gear case, characterized in that in one side of the gear case are provided openings which are equidistant from and parallel to the axis of the half-shafts, and that in the said openings are arranged axially-movable coupling pins of which the inner ends can engage in apertures which are provided in the adjacent differential bevel gear drive wheel. A further feature of the invention resides in the provision of parts and means for the installation of such locking means in an existing differential gear. Further and optional features of the invention appear from the following description and claims.

Figure 2:
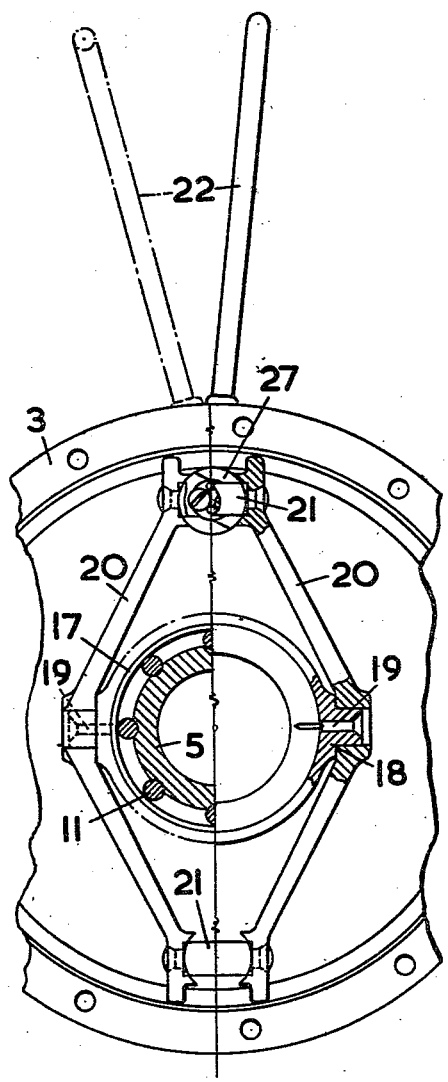
Figure 5:
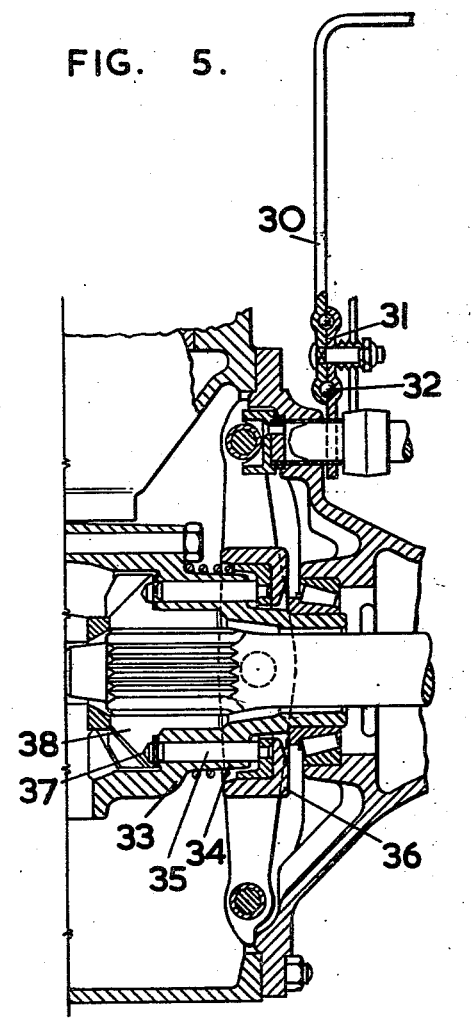
Figure 6:
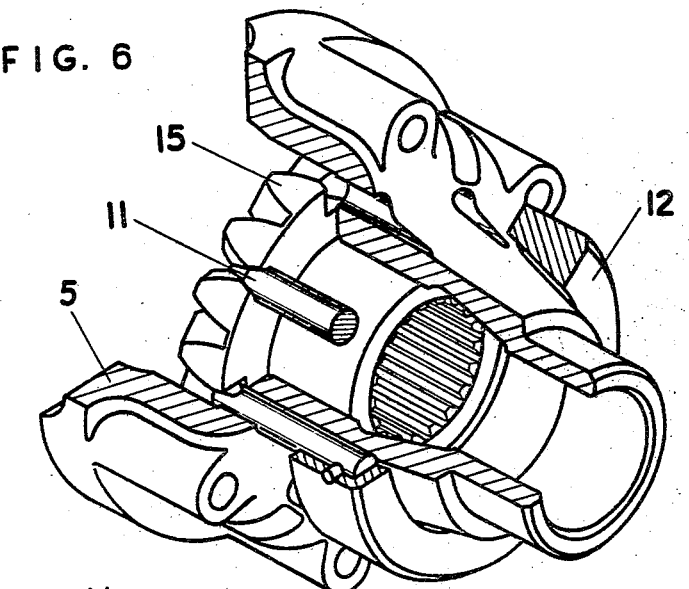
Figure 7:
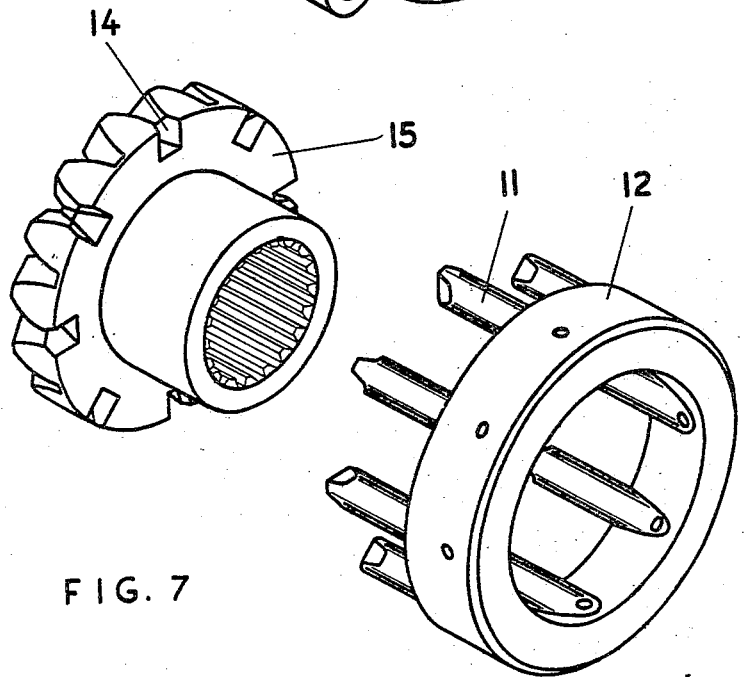

The invention is illustrated by way of example in the accompanying drawings, in which FIGURE 1 is a horizontal section through the differential gear of a tractor, FIGURE 2 is a partly sectional side elevation corresponding to FIGURE 1, FIGURES 3 to 5 illustrate various details and modifications, and FIGURES 6 and 7 illustrate in perspective views some of the parts of the gear which is represented in FIGURES 1 and 2.

The drawings illustrate a differential gear provided with locking means intended for subsequent installation in existing widely used tractors (f.e. 35).

In FIGURE 1 the arrow 1 indicates the forward direction of travel of the tractor, and there are shown the rear axle case 2 with the left-hand axle tube 3' and the right-hand axle tube 3. FIGURE 2 is a partly sectional view of the arrangement as seen in the direction of the right-hand axle tube 3. The installation of locking means in the tractor subsequent to the manufacture of the latter is effected as follows: after removal of the right-hand axle tube 3 with the half-shaft 4 the right-hand half 5 of the differential gear case is removed and modified according to FIGURE 4. The drilling template 6, which is supplied with the necessary parts, with the aid of a drilling sleeve 7 and twist drill 8 and driller or reamer 9 or a similar arrangement permits the provision of, for example, eight bores 10 which are parallel to the axis of the half-shaft 4 and equidistant therefrom and from each other and which serve for the reception of coupling pins 11. These coupling pins 11 are rigidly secured at one end to a coupling ring 12 (for example by means of fixing pins 13 or by hard soldering or brazing or welding), and at their other ends are provided with V-shaped and hardened heads (the angle *a* is approximately 30°), which heads can engage in complementary apertures 14 in the bevel gear drive wheels 15. These apertures 14 lie at the tooth gaps as shown in FIGURE 3 and are equidistant. Their number either corresponds to that of the coupling pins 11 (for example 8) or is a complete multiple thereof (for example 16) for the purpose of facilitating engagement. The apertures 14 are not provided in the original bevel gear drive wheels of the tractor as usually manufactured; it is therefore necessary either to exchange the bevel gear drive wheel 15 or to grind the apertures 14 in the original gear wheel according to FIGURE 3. The V-shaped heads of the coupling pins 11 ensure an automatic disengagement of the locking means upon the occurrence of an overload, whereby damage to the rear axle may be prevented.

In order to effect installation there are needed: bevel gear wheel drive 15 with the grooves or apertures 14, a special slip disc 16 (with openings for the coupling pins 11 and with means for preventing rotation), the modified differential gear case part 5, a return spring 17, and the coupling ring 12 with the coupling pins 11, also a coupling sleeve 18 (for example of bronze) with lubricating passages 19, and a coupling fork or rocker which comprises two similar yokes 20 which are secured to one another by (hardened) bolts 21 or by riveting or screws or other suitable means; also needed for installation are a foot pedal 22 with its boss 23 and the appertaining parts. The installation of the pedal boss 23 requires simply the removal of the bearing bush 24 and sealing ring 25 of the brake cross-shaft 26. On the inner side of the right-hand axle tube 3 is a double-sided steep edge cam 27 which is secured to the pedal boss 23, for example by means of fixing pins and screws. The edge cam 27 is supported at one side by means of a ring 28 of synthetic resin on the axle tube 3, and at the other side (after replacement of the right hand axle tube 3) it engages one of the bolts 21 of the coupling fork or rocker. In order to reduce wear the working surfaces of the parts 27 and 21 are hardened; also two rotatable tubular spacers or rollers may be arranged side by side on the bolt 21. The illustrated differential gear locking means is held in the engaged position (shown in dotted lines) by continuous foot pressure on the pedal 22 (or by means of a detent bracket or the like which is not shown); disengagement is effected either by a spring ring 29 or positively by inadvertent movement of the foot under the action of the axial forces acting on the V-shaped heads of the coupling pins 11.

A modification of the pedal is illustrated in FIGURE 5. This pedal 30 is pivotally secured to its boss 31 and possesses an overload and repeater device 32 comprising bails, guideway, and spring.

FIGURE 5 shows as a modification a differential locking means which is suitable in particular for direct installation by the vehicle manufacturer. Herein the differential gear case 33 is provided with cast-on eyes 34 for guiding the coupling pins 35 which may be of circular or other desired cross-section and which are pressed or riveted in the coupling ring 36. In this arrangement the conical heads of the coupling pins 35 engage in conical bores 37 in the differential gear drive wheel 38.

With omission of a safety release of the differential gear locking means the heads of the coupling pins 11 or 35 and also the corresponding apertures in the bevel gear drive wheel are not conical but are made at least substantially cylindrical. The parts 23 and 27 are forged of alloy steel or may be produced as accurate castings (with wax patterns).

Instead of the coupling fork or rocker being formed as a balance or see-saw lever there may be provided any other suitable operating mechanism (for example a hydraulic mechanism) with any suitable guidance through the rear axle housing or the axle tube and with foot- or hand-operated systems of any suitable kind.

I claim:
1. The combination comprising a differential gear and locking means for selectively locking said differential gear, said differential gear including a rotary gear case, two bevel gear wheels mounted for rotation in said gear case, a plurality of bevel pinions mounted for rotation in said gear case and each meshing with both of said bevel gear wheels, and two co-linear half-shafts extending from said gear case and secured one to each of said bevel gear wheels, said gear case having in one side a plurality of bores disposed equi-distantly from and parallel to and on a pitch circle concentric with one of said half-shafts, and one of said bevel gear wheels having a plurality of tapered openings, said locking means comprising a plurality of axially-movable coupling pins disposed one in each of said bores and each having a tapered end, and means for selectively moving said coupling pins axially in unison towards and away from said bevel gear having said tapered openings, the arrangement being such that when said coupling pins are moved axially for locking said differential gear each of said tapered ends enters one of said tapered openings and upon the occurrence of an overload the tapered form causes said tapered ends to be automatically forced out of said tapered openings.

2. The combination as claimed in claim 1, said means for selectively moving said coupling pins including a rotatable coupling ring secured to said coupling pins, a thrust cage forming a mounting for said coupling ring, and a rocker pivotally supporting said thrust cage.

3. The combination as claimed in claim 1, said means for selectively moving said coupling pins including a rotatable coupling ring secured to said coupling pins, a thrust cage forming a mounting for said coupling ring, and a rocker pivotally supporting said thrust cage, and a rotary cam, said rocker comprising two yokes and bolts securing said yokes together, and said cam acting upon one of said bolts.

4. The combination as claimed in claim 1, said means for selectively moving said coupling pins including a rotatable coupling ring secured to said coupling pins, a thrust cage forming a mounting for said coupling ring, and a rocker pivotally supporting said thrust cage, and a rotary cam, said rocker comprising two yokes and bolts securing said yokes together, and said cam acting upon one of said bolts, said combination further including an axle case comprising two axle tubes, and one end of said rocker being supported upon an internal edge of one of said axle tubes.

5. The combination as claimed in claim 1, said means for selectively moving said coupling pins including a rotatable coupling ring secured to said coupling pins, a thrust cage forming a mounting for said coupling ring, and a rocker pivotally supporting said thrust cage, and a rotary cam, said rocker comprising two yokes and bolts securing said yokes together, and said cam acting upon one of said bolts, said combination further including an axle case comprising two axle tubes, and one end of said rocker being supported upon an internal edge of one of said axle tubes, said means for selectively moving said coupling pins further including a hub secured to said cam and mounted in a hole in said one of said axle tubes, and an operating member secured to said hub.

6. The combination as claimed in claim 1, said means for selectively moving said coupling pins including an overload and repeater device.

7. The combination as claimed in claim 1, said gear case including cast-on eyes and said bores being provided in said eyes.

8. The combination as claimed in claim 1, said tapered openings and said tapered ends being V-shaped.

9. The combination as claimed in claim 1, said tapered openings and said tapered ends being V-shaped, said tapered openings being provided in said bevel gear wheel at the tooth gaps.

10. The combination as claimed in claim 1, said tapered openings and said tapered ends being V-shaped with an included taper angle of approximately 30°.

11. The combination as claimed in claim 1, said tapered ends being in the form of V-shaped and hardened heads with an included taper angle of approximately 30°, and said tapered openings being complementary to said tapered ends and being ground in said bevel gear wheel between the teeth thereof.

References Cited in the file of this patent

UNITED STATES PATENTS

| | | |
|---|---|---|
| 964,387 | Burnam | July 12, 1910 |
| 1,173,442 | Kuhn | Feb. 29, 1916 |
| 1,193,017 | Higinbotham | Aug. 1, 1916 |
| 1,719,095 | West | July 2, 1929 |

FOREIGN PATENTS

| | | |
|---|---|---|
| 1,703 | Great Britain | Nov. 11, 1913 |
| 26,945 | Great Britain | Aug. 18, 1910 |
| 530,696 | Italy | July 13, 1955 |
| 820,690 | Germany | Nov. 12, 1951 |